United States Patent [19]

Mose et al.

[11] Patent Number: 4,876,637
[45] Date of Patent: Oct. 24, 1989

[54] POWER CONVERTER AND METHOD OF CONTROLLING THE SAME

[75] Inventors: Tadao Mose, Tachikawa; Yasuhiro Andoh, Hachioji; Tatuhisa Kitasin, Fuchu, all of Japan

[73] Assignee: Kabushiki Kaisha Toshiba, Kawasaki, Japan

[21] Appl. No.: 326,647

[22] Filed: Mar. 21, 1989

[30] Foreign Application Priority Data

Mar. 22, 1988 [JP] Japan .................................. 63-65651
Apr. 6, 1988 [JP] Japan .................................. 63-83145

[51] Int. Cl.$^4$ .......................................... H02M 5/458
[52] U.S. Cl. ...................................... 363/37; 363/50; 363/51; 363/96; 318/802; 318/811
[58] Field of Search ..................... 363/35, 37, 41, 50, 363/51, 54, 57, 58, 95, 96; 318/800, 801, 802, 806, 811

[56] References Cited

U.S. PATENT DOCUMENTS

| | | | |
|---|---|---|---|
| 4,328,454 | 5/1982 | Okuyama et al. | 363/37 |
| 4,376,968 | 3/1983 | Wueschinski et al. | 363/37 |
| 4,620,296 | 10/1986 | Siemon | 363/51 |
| 4,672,520 | 6/1987 | Ueda et al. | 363/37 |
| 4,758,771 | 7/1988 | Saito et al. | 318/800 |

Primary Examiner—Peter S. Wong
Attorney, Agent, or Firm—Oblon, Spivak, McClelland, Maier & Neustadt

[57] ABSTRACT

A power converter converts AC input power into AC output power to which a load is connected. This power converter comprises a controller for controlling power converting operation of the power converter, a DC voltage detector for detecting a DC voltage of the DC power to provide a DC voltage signal, a first reference generator for generating a first reference, an output detector for detecting a condition of the AC output power to provide an output condition signal, a second reference generator for generating a second reference in response to the output condition signal, a condition detector for detecting a condition of the AC input power to provide an output condition signal, and a selector for supplying the second reference to the controller when the input condition signal is provided.

16 Claims, 5 Drawing Sheets

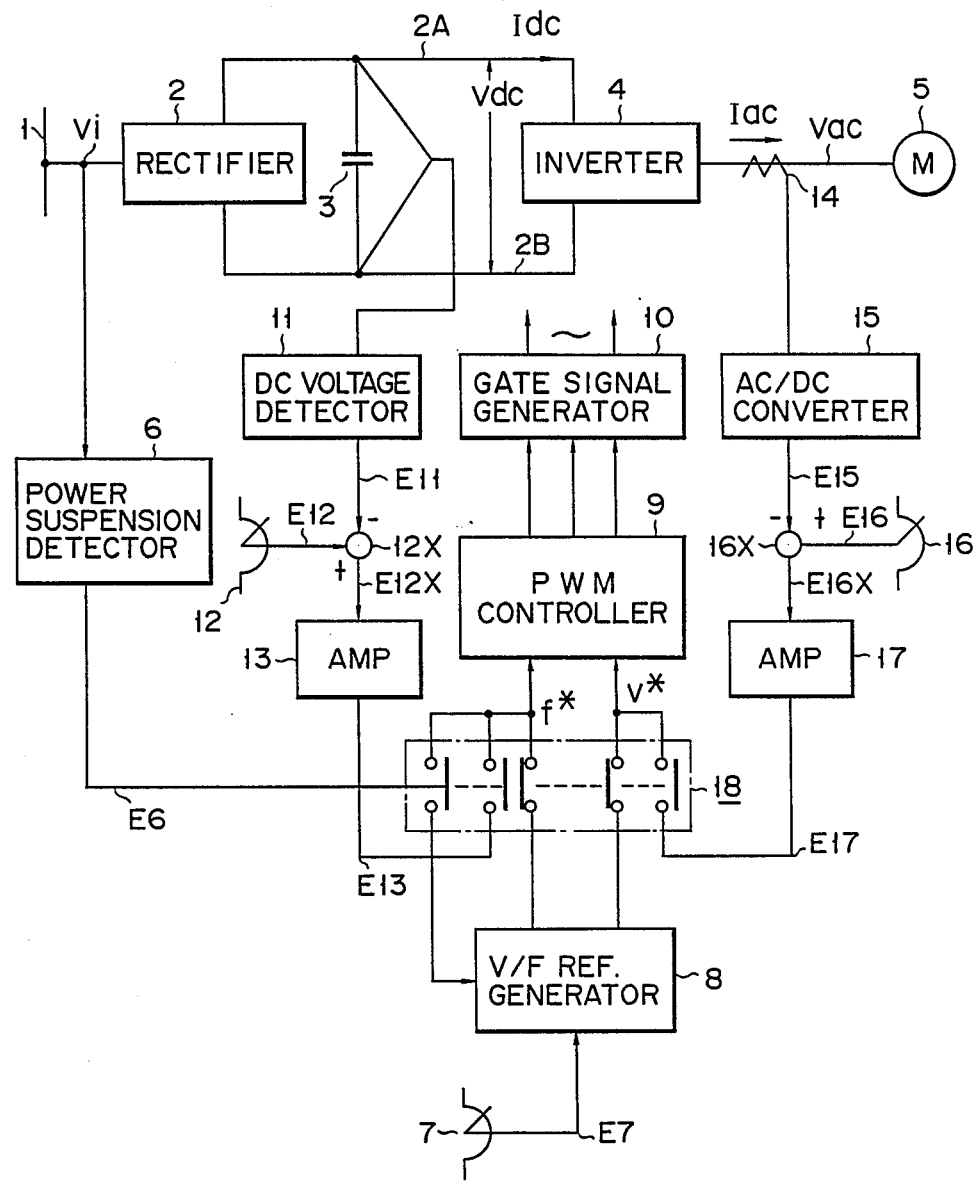
F I G. 1

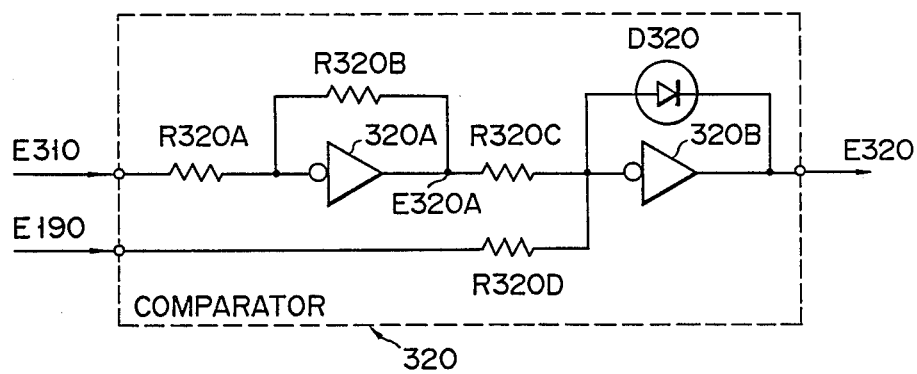
FIG. 4
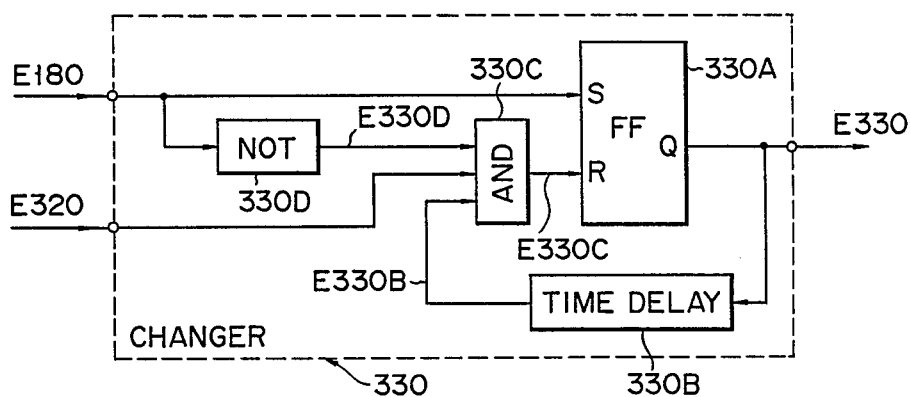
FIG. 5
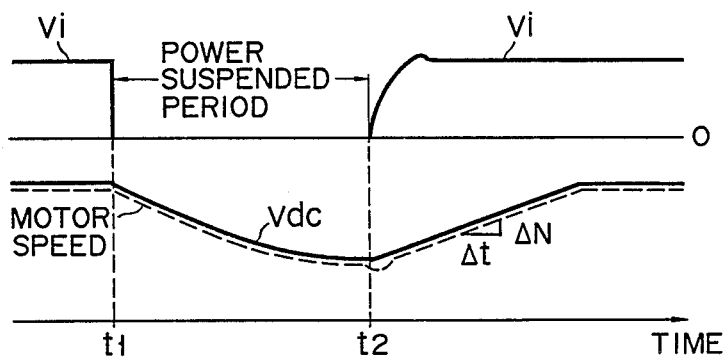
FIG. 6A
FIG. 6B

POWER CONVERTER AND METHOD OF CONTROLLING THE SAME

BACKGROUND OF THE INVENTION

1. Field of the Invention

The present invention relates to a power converter and, more particularly, to a power converter including a control system in consideration of a countermeasure against instantaneous power interruption.

2. Description of the Related Art

FIG. 7 shows a typical power converter for supplying an AC power of a variable voltage and a variable frequency to an AC motor and variably controlling the motor speed.

This self-excited converter is controlled as follows.

Speed reference signal E7 supplied from speed setting circuit 7 is separated into output voltage reference V* and output frequency reference f* of self-exited inverters 2 and 4 by V/F reference generator 8, and the references are input to PWM controller 9. The pulse width control is performed in PWM controller 9 in accordance with supplied output voltage reference V* and output frequency reference f* and ON/OFF patterns of switching devices (not shown) of inverter 4 are generated. The ON/OFF patterns are respectively converted into ON/OFF gate signals by gate signal generator 10, and the signals are output to each switching device (not shown) as gate signals.

With the above arrangement, predetermined voltage and frequency are supplied to load motor 5, and the speed of load motor 5 is variably controlled.

Power interruption detector 6 is arranged at AC power supply 1 to detect power interruption when the power of the AC power supply is suspended. When power interruption detector 6 detects power interruption, an operation of gate signal generator 10 is stopped in response to detection signal E6 so that an ON/OFF operation of the switching device (not shown) in inverter 4 is stopped. Therefore, the self-excited inverters are stopped and wait until power is restored.

When the power of AC power supply 1 is restored and power interruption detector 6 detects this state, the self-excited inverters are restarted after a predetermined time period is elapsed, i.e., terminal voltage Vac of load motor 5 is set at a predetermined value or less. This is to prevent an overcurrent of outputs from self-excited inverters 2 and 4.

The power converter having the above arrangement has the following problems.

More specifically, the self-excited inverters cannot be restarted until terminal voltage Vac of load motor 5 is set at a predetermined value or less. In addition, since an output is gradually increased so as to prevent the overcurrent, a sufficient time period is required until the self-excited inverters are restarted to generate a predetermined torque, and a reduction in motor speed is stopped to reaccelerate the motor. Therefore, the motor speed is undesirably reduced more than necessary.

FIG. 8 shows another conventional arrangement wherein a speed of an AC motor is variably controlled using a power converter such as an inverter.

Referring to FIG. 8, when AC input voltage Vi fails due to power interruption, the failure is detected by power interruption detector 180. A gate signal of rectifier 2 is shifted or shift-blocked by phase controller 210, and inverters 2 and 4 are stopped. Thereafter, the power restoration of power supply 1 is detected by power interruption detector 180. Then, the operation is restarted after it is confirmed that terminal voltage Vac of load motor 5 is set at a predetermined value or less. This is to prevent the overcurrent of inverters 2 and 4 by voltage controller 200 and oscillator 220. Note that stop circuit 240 monitors an output from current transformer 14. When an overcurrent is supplied to load motor 5, the operation of inverters 2 and 4 is stopped.

In the above-mentioned power converter, in order to assure an output voltage during a power interruption period, the capacitance of DC smoothing circuit 130 must be increased. In this case, the power converter stops control upon detection of power interruption, and is restarted after power restoration. In such a converter, when motor terminal voltage Vac remains, an overcurrent tends to occur in accordance with a motor terminal voltage phase, power converter output phase, and a DC voltage Vdc level. For this reason, upon restart of the power converter, after motor terminal voltage Vac is set at a predetermined value or less, the output frequency must be gradually increased while the output voltage and frequency of inverter 4 are precisely controlled and overcurrent is suppressed. Then, a time required for restart is prolonged, and the motor speed is undesirably reduced more than necessary.

SUMMARY OF THE INVENTION

It is a first object of the present invention to provide a power converter for suppressing a reduction in motor speed during power interruption to be a minimum value.

To achieve the object of this invention, a power converter for converting AC input power into AC output power to which a load is connected, comprises: control means for controlling power converting operation of the power converter; DC voltage detector means for detecting a DC voltage of the DC power to provide a DC voltage signal; first reference generator means for generating a first reference; output detector means for detecting a condition of the AC output power to provide an output condition signal; second reference generator means for generating a second reference in response to the output condition signal; condition detector means for detecting a condition of the AC input power to provide an input condition signal; and selector mean for supplying the second reference to the control means if the input condition signal is provided.

In other words, according to the present invention, the power converter is driven so that a motor (load) keeps an unloaded driving state during power interruption, and immediately generates a load torque when a DC voltage having a predetermined value is assured and power restoration is detected.

A second object of the present invention is to provide a power converter comprising a controlling means for controlling a DC voltage and power converter output frequency in accordance with a reduction in motor speed upon power interruption, controlling an output phase so that a motor terminal voltage phase and a power converter output phase are controlled to be always constant, and performing restart after a power supply is restored in a shortest time period without waiting for a decreases in motor terminal voltage.

In order to achieve the above second object, according to the present invention, during power interruption, a motor speed is detected in accordance with terminal voltage Vac of load motor 5. The output frequency of the power converter is controlled in response to the detection signal, so that DC voltage Vdc follows the motor speed to be controlled. Therefore, the magnetic flux of motor 5 is assured to be a predetermined value or more during power interruption. After power restoration, DC voltage Vdc is increased by a DC voltage controller (200, 210) in accordance with a predetermined function Therefore, the above controller for controlling a DC voltage during power interruption controls to increase an output frequency so that DC voltage Vdc is decreased, and motor 5 is accelerated in a shortest time period.

In the power converter having the above arrangement, the ratio between motor terminal voltage Vac and the motor speed is controlled to be constant during power interruption. After power restoration, DC voltage Vdc is increased in accordance with a predetermined function, so that the motor speed can be smoothly controlled to be accelerated in a shortest time period.

BRIEF DESCRIPTION OF THE DRAWINGS

FIG. 1 is a block diagram showing an arrangement of a power converter according to an embodiment of the present invention;

FIG. 4 is a block diagram illustrating an arrangement of a comparator (320) shown in FIG. 2;

FIG. 5 is a block diagram illustrating an arrangement of a changer (330) shown in FIG. 2;

FIGS. 6A and 6B are waveform charts for explaining a predetermined function representing a change in DC current voltage in the power converter after power restoration;

DETAILED DESCRIPTION OF THE PREFERRED EMBODIMENTS

Figure 2:
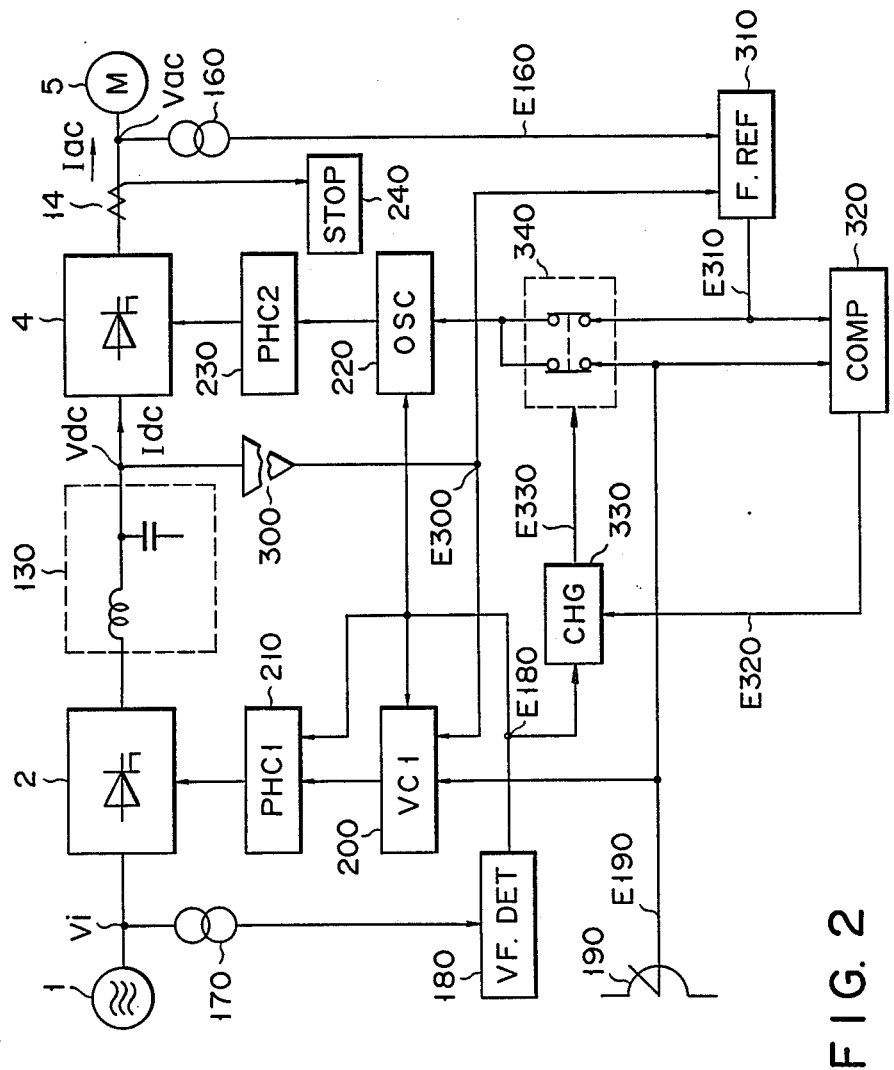
FIG. 2 is a block diagram showing an arrangement of a power converter according to another embodiment of the present invention.

An embodiment of the present invention will be described hereinafter with reference to FIG. 1.

Note that the same reference numerals in the following description denote the same parts as in the above description, and a description thereof is omitted.

As shown in FIG. 1, in this embodiment, power interruption detector 6 detects power interruption. Output voltage reference V* and output frequency reference f* of self-excited inverters are switched by switching circuit 18 in response to power interruption detection signal E6. More specifically, deviation E16X between load current signal E15 obtained by signal-converting load current Iac detected by load current detector 14 by AC/DC converter 15, and value E16 set by current setting circuit 16 is operationally amplified by operational amplifier 17, so that signal E17 is obtained. Signal E17 serves as output voltage reference v*.

Deviation E12X between DC voltage signal E11 detected by DC voltage detector 11 and value E12 set by DC voltage setting circuit 12 is operationally amplified by operational amplifier 13 to obtain signal E13. Signal E13 serves as output frequency reference f*.

In this embodiment with the above arrangement, when the power of power supply 1 is suspended, circuit 18 is immediately switched in response to output E6 from detector 6, and output voltage reference V* and output frequency reference f* are converted into signals E13 and E17, respectively. Therefore, the following driving state is obtained.

Assume that set value E12 of DC voltage setting circuit 12 is set at a normal DC voltage value. If DC voltage Vdc is decreased, output frequency reference f* is decreased in response to signal E13 obtained by operationally amplifying the difference between set value E12 and DC voltage signal E11 by operational amplifier 13.

When the output frequency of the self-excited inverter is decreased as compared with a value corresponding to the motor speed of motor 5, motor 5 performs a regenerating operation. Therefore, motor 5 serves as a generator, and its mechanical energy is converted into electrical energy. Capacitor 3 connected to DC power supply lines 2A and 2B is charged by the electrical energy, and DC voltage Vdc is increased to value E12 set by DC voltage setting circuit 12. Thus, DC voltage Vdc is kept at a predetermined value on the basis of set value E12.

In this state, since self-excited inverters 2 and 4 consume little power, the value of the inverter output frequency is substantially equal to the value of the motor speed of motor 5. When value E16 corresponding to an unloaded current is set by current setting circuit 16 in this state, inverter output voltage Vac is determined so that a current corresponding to the set unloaded current is supplied as output current Iac of the selfexcited inverters.

In the above driving state, the output frequency of the self-excited inverter is determined in accordance with the motor speed of motor 5, and only current Iac corresponding to an unloaded current is supplied to motor 5. In other words, motor 5 is kept in a substantially rated exciting state. In addition, DC voltage Vdc is always kept at a value corresponding to a normal value after power restoration.

After power supply 1 is restored from the power interruption state, therefore, output frequency reference f* at this time serves as a speed set value, so that motor 5 can be immediately accelerated to a speed set by speed setting circuit 7 from a current speed, thereby preventing unnecessary reduction in motor speed.

As described above, according to the present invention, even if the power of AC power supply 1 is suspended, the power converter continues its operation so that motor 5 itself keeps an unloaded driving state, and the power converter keeps a driving state as if no power interruption occurs. Therefore, reacceleration of motor 5 after power restoration can be performed in a shortest time period.

Figure 8:
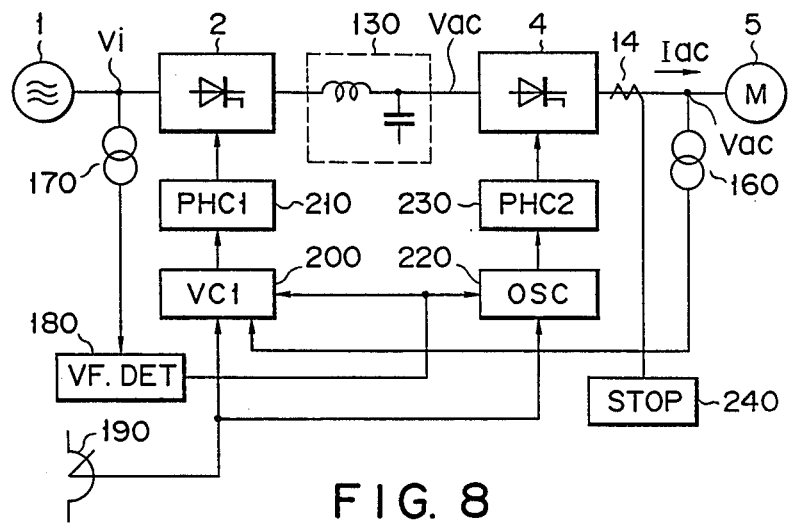
FIG. 8 is a block diagram showing an arrangement obtained by excluding the arrangement of the present invention from the embodiment shown in FIG. 2 (not prior art).

Another embodiment of the present invention will be described hereinafter with reference to FIG. 2. Note that the reference numerals in FIG. 2 denote the same parts as in FIG. 8, and a description thereof is omitted.

As shown in FIG. 2, a power converter according to the present invention comprises: insulated amplifier 300 for detecting DC voltage Vdc; reference generator 310 for generating output frequency reference E310 until power is restored and control is started after power interruption in response to output signal E300 from amplifier 300 and terminal voltage detection signal E160 of load motor 5; comparator 320 for comparing signal E190 from speed reference generator 190 with output signal E310 from reference generator 310, and detecting their coincidence; changer 330 for generating reference changing signal E330 on the basis of output signal E320 from comparator 320 and signal E180 from voltage failure detector (power interruption detector) 180; and switch 340 for switching reference E190 or E310 to be input to oscillator 220 in response to changing signal E330.

With the above arrangement, when the power of AC power supply 1 is suspended, the power interruption is detected by power interruption detector 180, and detection signal E180 is supplied to voltage controller 200 and phase controller 210. Then, a gate signal supplied to rectifier 2 is shifted or shift-blocked. Thus, the control for switching devices (thyristor or the like) in rectifier 2 is stopped.

During the above operations, power interruption detection signal E180 from power interruption detector 180 is supplied to changer 330, and reference switch 340 is switched. Thus, signal E190 from speed reference setting circuit 190 which is previously used is disconnected, and output signal E310 of reference generator 310 is connected to oscillator 220.

Terminal voltage (remaining voltage) Vac of load motor 5 is detected by voltage transformer 160, and the speed and voltage phase of load motor 5 are calculated by reference generator 310 in response to detection signal E160. In reference generator 310, DC voltage detection signal E300 from insulated amplifier 300 is compared with a speed signal (E311G in FIG. 3) of load motor 5 calculated in reference generator 310, and reference signal E310 corresponding to the operation frequency of inverter 4, having a predetermined ratio, is supplied to oscillator 220 through switch 340. Therefore, the frequency and phase of inverter 4 are controlled. At this time, DC voltage Vac of inverters 2 and 4 and terminal voltage Vac of load motor 5 are controlled in accordance with a proportional relationship. With this control, terminal voltage Vac and motor speed of load motor 5 constantly keep a predetermined relationship, and the magnetic flux of load motor 5 is always kept at a predetermined value during power interruption.

Thereafter, when power restoration of power supply 1 is detected by power interruption detector 180, power restoration detection signal E180 is supplied to phase controller 210 and voltage controller 200, and these controllers restart control. Thus, DC voltage control in rectifier 2 is started. At this time, the DC voltage reference signal supplied to voltage controller 200 is set signal E190 of speed reference setting circuit 190. In this case, DC voltage Vdc is caused to follow set value E190 of speed reference setting circuit 190 by voltage controller 200. For example, when set value E190 is set at a value larger than DC voltage Vdc upon power restoration, reference generator 310 mentioned in the above description for the control during power interruption, controls the frequency and phase of inverter 4 to decrease DC voltage Vdc, thus increasing input current Iac to load motor 5.

In order to decrease DC voltage Vdc, a larger amount of current Iac may be supplied to load motor 5. Therefore, the phase of inverter 4 advances, so that the control for increasing current Iac and decreasing DC voltage Vdc is performed. However, the power supplied from rectifier 2 is sufficiently assured by power restoration of AC power supply 1. For this reason, the frequency of inverter 4 is increased as the phase is shifted, and the motor speed of load motor 5 is accelerated. Thereafter, the coincidence between the value of output E310 from reference generator 310 and the value of output E190 from speed reference setting circuit 190 is detected by comparator 320, and switch 340 is switched to a normal driving mode through changer 330 (in this state, oscillator 220 is operated in response to signal E190).

Note that the speed and phase of the motor can be detected by a mechanical means. In this case, the same effect as in the embodiment shown in FIG. 2 can be obtained.

Figure 3:
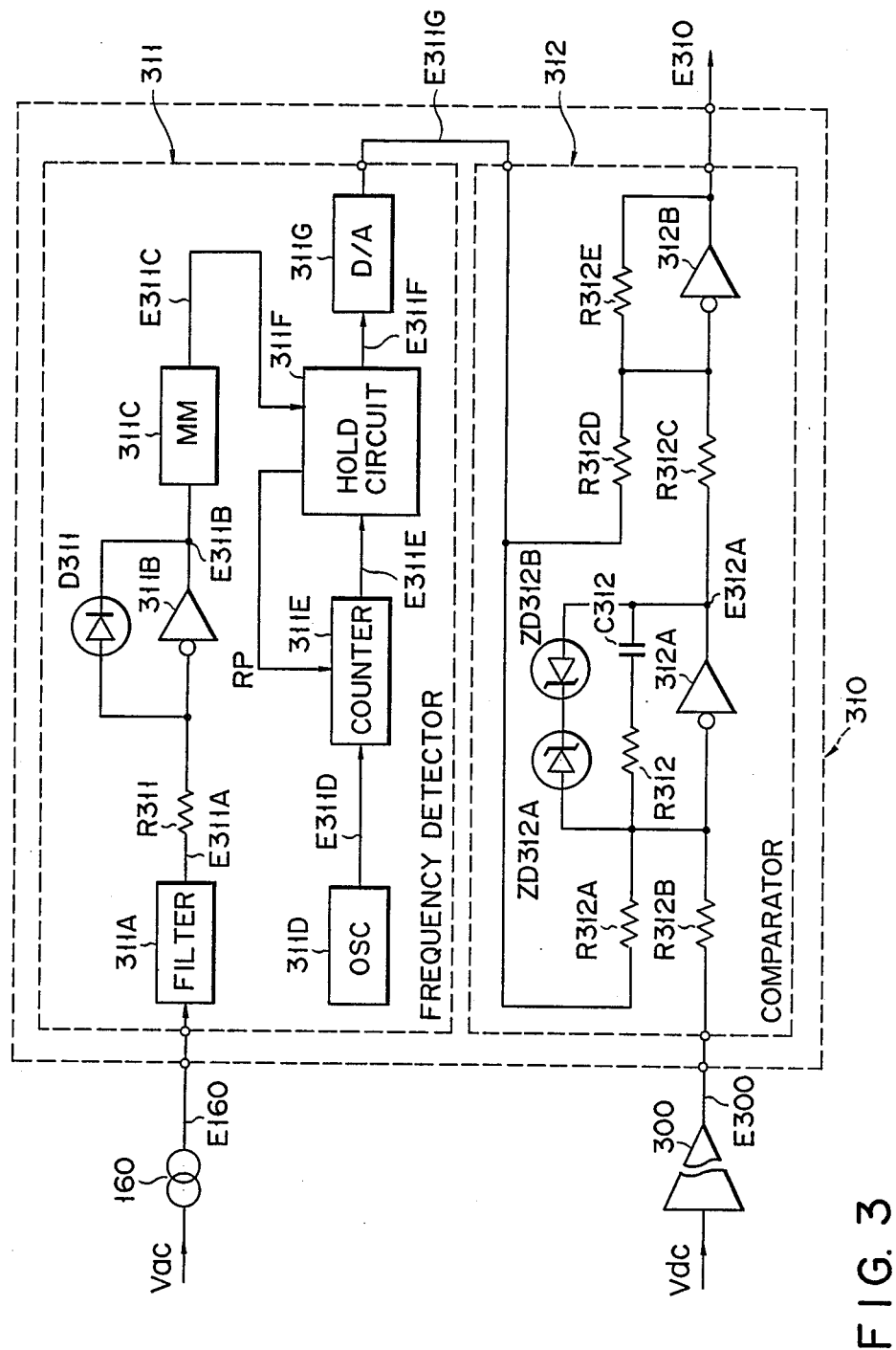
FIG. 3 is a block diagram illustrating an arrangement of a reference generator (310) shown in FIG. 2.
Figure 7:
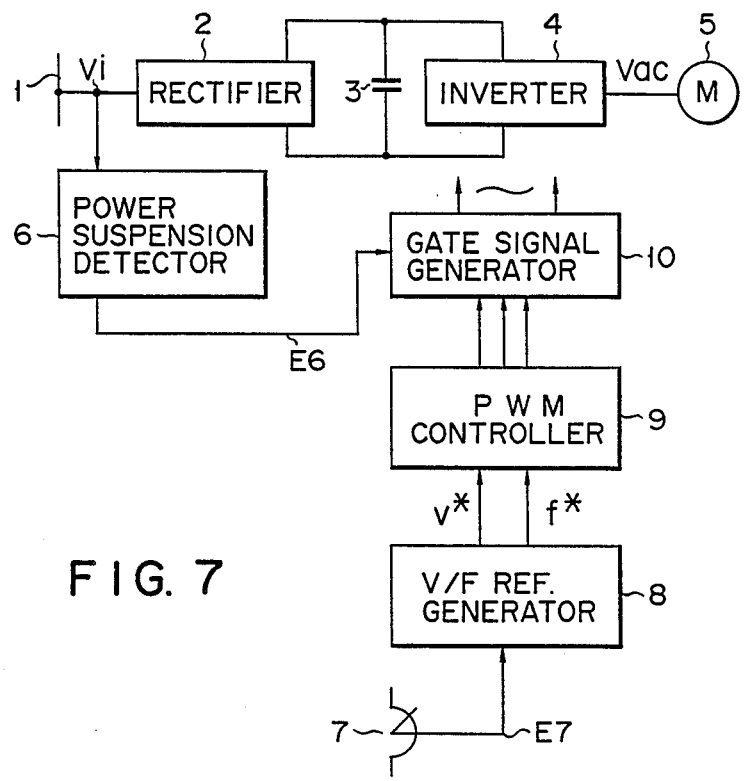
FIG. 7 is a block diagram showing an arrangement obtained by excluding the arrangement of the present invention from the embodiment shown in FIG. 1 (not prior art)

FIG. 3 shows an arrangement of typical reference generator 310 in FIG. 2.

Signal E160 representing terminal voltage Vac of load motor 5 is converted into sine-wave signal E311A having no high-frequency noise through low-pass filter 311A. Signal E311A is input to a zero-crossing sensor including resistor R311, inverting amplifier 311B, and diode D311. Signal E311A is converted into rectangular-wave signal E311B having a duty ratio of 50% (phase angle: 180°) by the zero-crossing sensor.

When the potential of signal E311A zero-crosses from a positive value to a negative value, rectangular-wave signal E311B rises from logic "0" to logic "1". When signal E311B rises, monostable multivibrator 311C is triggered. Then, monostable multivibrator 311C generates pulse signal E311C set at logic "1" at the leading edge of signal E311B.

Pulse signal E311C is generated at a rate of one pulse per period (e.g., 50 ms) of terminal voltage Vac, and is input to hold circuit (latch circuit) 311F. Hold circuit 311F outputs reset pulse RP for every input of pulse signal E311C.

On the other hand, clock pulse E311D having a period (e.g., 0.05 ms) much shorter than terminal voltage Vac is input to counter 311E from pulse oscillator 311D. Counter 311E is reset in response to reset pulse RP, and counts clock pulse E311D generated during one period of reset pulse RP. Count result E311E is temporarily stored in hold circuit 311F.

More specifically, hold circuit 311F stores data E311F obtained by digitizing one period of terminal voltage Vac (one period of reset pulse RP) by a count value of clock pulse E311D. Period data E311F is updated every period of terminal voltage Vac, and converted into analog signal E311G by D/A converter 311G. This signal E311G includes phase or frequency data of voltage Vac of motor 5.

The above-mentioned circuit elements 311A to 311G constitute a means for detecting a period or frequency of terminal voltage Vac of load motor 5.

The above-mentioned analog signal E311G is input to inverting amplifier 312A through resistor R312A. Amplifier 312A receives signal E300 representing DC output voltage Vdc of rectifier 2 through resistor R312B. Output E312A from amplifier 312A is subjected to negative feedback to its input terminal through capacitor C312 and resistor R312.

Thus, a proportional integrating circuit for comparing analog signal E311G with DC voltage signal E300 and proportionally integrating and amplifying the comparison result is constituted.

Note that a series circuit of opposed-connected constant voltage diodes Z312A and Z312B which is connected in parallel with a series circuit of capacitor C312 and resistor R312 is employed to obtain a limiter function for limiting the voltage level of output E312A from amplifier 312A to a predetermined value or less.

Output E312A from amplifier 312A is input to inverting amplifier 312B through resistor R312C. Amplifier 312B also receives the above-mentioned analog signal E311G through resistor R312D. Output E310 from amplifier 312B is subjected to negative feedback to its input terminal through resistor R312E. Thus, an adder for adding analog signal E311G to output E312A is constituted.

FIG. 4 shows an arrangement of typical comparator 320 in FIG. 2.

Output E310 from reference generator 310 is input to inverting amplifier 320A through resistor R320A. Output E320A from amplifier 320A is subjected to negative feedback to its input terminal through resistor R320B. Output E320A is input to inverting amplifier 320B through resistor R320C. Amplifier 320B also receives speed reference set value E190 through resistor R320D. The output terminal of amplifier 320B is connected to its input terminal through a cathode-anode path of diode D320.

Amplifier 320B compares level −E310 with level 190. Amplifier 320B outputs signal E320 set at logic "1" when E190<E310, and outputs signal E320 set at logic "0" when E190>E310.

FIG. 5 shows an arrangement of typical changer 330 in FIG. 2.

When power interruption detector 180 detects power interruption of AC power supply 1 and output E180 from detector 180 rises to logic "1", RS flip-flop 330A is set and Q output E330 therefrom is set at logic "1". Switch 340 shown in FIG. 2 is switched in response to logic "1" output E330. Therefore, reference generator output E310 is supplied to oscillator 220 in place of speed reference set value E190.

Output E330 set at logic "1" is delayed by delay circuit 330B by a predetermined time (e.g., about 1 μs), and serves as delay signal E330B. Signal E330B is supplied to the first input terminal of AND gate 330C. Signal E320 is input to the second input terminal of AND gate 330C, and signal E330D is input to the third input terminal thereof. (This signal E330D is obtained by inverting the level of output E310 by NOT gate 330D).

Assume that when flip-flop 330A is kept set (both signals E330 and E330B are set at logic "1") and the logic level of signal E320 is set at "1", power suspension detector 180 detects power restoration of AC power supply 1 and output E180 is set at logic "0". Therefore, AND gate 330 is enabled and flip-flop 330A is reset in response to output E330C from AND gate 330C.

Then, Q output E330 from flip-flop 330A is set at logic "0". Switch 340 shown in FIG. 2 is switched in response to logic "0" output E330, and speed reference set value E190 is supplied to oscillator 220 in place of reference generator output E310.

Note that power interruption detector 180 shown in FIG. 2 may be the same as power interruption detector 6 shown in FIG. 1.

FIGS. 6A and 6B are waveform charts showing a change in DC voltage Vdc in the power converter after power restoration.

As represented by time t1 in FIG. 6A, when the power of AC power supply 1 is suspended, AC input voltages Vi of inverters 2 and 4 fall to "0". Thereafter, when the power of AC power supply 1 is restored at time t2, AC input voltage Vi is rapidly returned to a rated voltage value. Then, DC voltage Vdc inside the inverter increases at a predetermined rate of change (predetermined function) ΔN/Δt in accordance with the return of input voltage Vi, where Δt is the unit time, and ΔN is the rate of change in motor speed per unit time.

The change in DC voltage Vdc is a function which satisfies, e.g., the following condition:

$$I_{max} \geq \frac{\Sigma GD^2 \times NS \times \Delta N}{975 \times 375 \times kW \times \Delta t} + IN \qquad (1)$$

where
  $\Sigma GD^2$: total moment of inertia $GD^2$ of motor and its load
  NS: synchronizing speed of motor
  KW: rated output of motor
  IN: load current to motor (corresponding to Iac in FIGS. 1 and 2)
  Imax: maximum allowable current of inverter Note that the above predetermined function can be defined as follows. More specifically, load current IN is predicted in accordance with a motor speed on the basis of known data, and output voltage Vdc of rectifier 2 is increased so that a current obtained by adding motor accelerating current Iacc to predicted load current IN serves as DC input current Idc of inverter 4. In this case, motor accelerating current Iacc is determined to satisfy, e.g., the following condition:

$$I_{acc} = \frac{\Sigma GD^2 \times NS \times \Delta N}{975 \times 375 \times kW \times \Delta t} \qquad (2)$$

Note that load current IN is predicted under the following condition. More specifically, the load current is kept constant independently of the motor speed (in the case of a constant-torque load), or the load current is kept substantially proportional to the square value of the motor speed (in the case of a square-torque load).

According to the present invention, motor speed N and the phase or frequency of voltage Vac of motor 5 are detected during power interruption (Vi=0). The output frequency and phase of the power converter are controlled in accordance with detection signal E310, and DC voltage Vdc is controlled in correspondence with (in proportion to) motor speed N. Therefore, the following effects can be obtained.

(1) After power restoration, motor 5 can be immediately controlled independently of the presence/absence of motor terminal voltage Vac.

(2) Since a motor magnetic flux is determined at a constant value during power interruption, re-excitation of the motor is not required after power restoration, and a motor speed can be accelerated in a shortest time period.

(3) After the power restoration, the motor is accelerated to set value E190 of speed reference setting circuit 190. When set value E190 coincides with output E310 from reference generator 310, reference switching is performed by switch 340. Therefore, a shift to the normal driving mode can be smoothly performed.

What is claimed is:

1. A power converter for converting AC input power into DC power and converting the DC power into AC output power to which a load is connected, said power converter comprising:
   control means for controlling power converting operation of said power converter;
   DC voltage detector means for detecting a DC voltage of the DC power to provide a DC voltage signal;
   first reference generator means for generating a first reference;
   output detector means for detecting a condition of the AC output power to provide an output condition signal;
   second reference generator means, coupled to said output detector means, for generating a second reference in response to said output condition signal;
   condition detector means for detecting a condition of the AC input power to provide an input condition signal; and
   selector means, coupled to said condition detector means and said control means, for supplying said second reference to said control means when said input condition signal is provided.

2. A power converter according to claim 1, wherein said first reference generator means generates the first reference in accordance with a difference between said DC voltage signal and a given DC voltage reference.

3. A power converter according to claim 2, wherein said output detector means detects an output current flowing to the load and provides an output current signal representing said output condition signal.

4. A power converter according to claim 3, wherein said second reference generator means is responsive to a given AC current reference, and generates the second reference in accordance with a difference between said output current signal and a given AC current reference.

5. A power converter according to claim 4, wherein said condition detector means detects power interruption of the AC input power and provides a power interruption signal representing said input condition signal.

6. A power converter according to claim 5, further comprising reference generator means for generating a frequency reference and a voltage reference, and wherein said selector means supplies said frequency reference and said voltage reference to said control means when no power interruption occurs at the AC input power, and supplies, in place of said frequency reference and said voltage reference, said first reference and said second reference to said control means when said power suspension signal is provided.

7. A power converter according to claim 1, wherein said second reference generator means generates the second reference in accordance with said output condition signal and said DC voltage signal.

8. A power converter according to claim 7, further comprising comparator means, coupled to said first reference generator means and said second reference generator means, for comparing said second reference with said first reference to provide a comparison output.

9. A power converter according to claim 8, wherein said selector means supplies said first reference to said control means when no substantial voltage reduction occurs in the AC input power, and supplies, in place of said first reference, said second reference to said control means in response to said comparison output when said input condition signal is provided.

10. A power converter according to claim 1, wherein said second reference generator means includes:
    frequency detector means for detecting frequency of an AC output voltage applied to the load, and providing a frequency signal having a signal level corresponding to the frequency of the AC output voltage; and
    means, coupled to said frequency detector means and to said DC voltage detector means, for combining said frequency signal with said DC voltage signal to provide said second reference signal.

11. A power converter for converting AC input power into DC power and converting the DC power into AC output power to which a load is connected, said power converter comprising:
    control means for controlling power converting operation of said power converter;
    DC voltage detector means for detecting a DC voltage of the DC power to provide a DC voltage signal;
    first reference generator means, coupled to said DC voltage detector means and being responsive to a given DC voltage reference, for generating a first reference corresponding to a difference between said DC voltage signal and said DC voltage reference;
    output current detector means for detecting an output current flowing to the load to provide an output current signal;
    second reference generator means, coupled to said output current detector means and being responsive to a given AC current reference, for generating a second reference corresponding to a difference between said output current signal and said AC current reference;
    reference generator means for generating a frequency reference and a voltage reference;
    power interruption detector means for detecting power interruption of the AC input power to provide a power interruption signal; and
    selector means, coupled to said power interruption detector means, said reference generator means, and said control means, for supplying said frequency reference and said voltage reference to said control means when no power interruption occurs at the AC input power, and for supplying, in place of said frequency reference and said voltage reference, said first reference and said second reference to said control means when said power interruption signal is provided.

12. A power converter for converting AC input power into DC power and converting the DC power into AC output power to which a load is connected, said power converter comprising:
    control means for controlling power converting operation of said power converter;
    DC voltage detector means for detecting a DC voltage of the DC power to provide a DC voltage signal;
    output voltage detector means for detecting an AC output voltage applied to the load to provide an output voltage signal;
    first reference generator means for generating a first reference;
    second reference generator means, coupled to said output voltage detector means and said DC voltage detector means, for generating a second reference corresponding to said output voltage signal and said DC voltage signal;

comparator means, coupled to said first reference generator means and said second reference generator means, for comparing said second reference with said first reference to provide a comparison output;

input voltage detector means for detecting reduction in a voltage of the AC input power to provide a voltage reduction signal; and selector means, coupled to said input voltage detector means, said comparator means, and said control means, for supplying said first reference to said control means when no substantial voltage reduction occurs in the AC input power, and for supplying, in place of said first reference, said second reference to said control means when said voltage reduction signal is provided.

13. A power converter for rectifying a power from an AC power supply, converting the power into a DC power, and converting the DC power into an arbitrary AC power, comprising:

power interruption detecting means for detecting power interruption of said AC power supply;

voltage detecting means for detecting a voltage of the DC power;

DC voltage reference setting means for setting a DC voltage reference;

current detecting means for detecting a current of the arbitrary AC power;

AC current reference setting means for setting an AC current reference;

voltage deviation calculating means for comparing an output signal from said voltage detecting means with an output signal from said DC voltage reference setting means, and calculating a deviation therebetween;

current deviation calculating means for comparing an output signal from said current detecting means with an output signal from said AC current reference setting means, and calculating a deviation therebetween; and controlling means for amplifying the output signal from said voltage deviation calculating means in response to an output signal from said power interruption detecting means to obtain an output frequency of said power converter, keeping the voltage of the DC power at said DC voltage reference, amplifying the output signal from said current deviation calculating means to obtain an output voltage of said power converter, and performing control to supply a desired current to a load on the basis of the output frequency and the output voltage.

14. In a power converter comprising inverter converting means for rectifying a power from an AC power supply, converting the power into a DC power, and converting a voltage of the DC power into an arbitrary AC power by PWM control; and a capacitive load for processing reactive power of the load, a method of controlling said power converter comprising the steps of:

amplifying a deviation between a DC voltage reference being set such that the voltage of the DC power becomes an arbitrary voltage and the detected actual DC voltage to determine an output frequency of said inverter converting means when power interruption of said AC power supply is detected;

amplifying a deviation between a load current reference being set such that a load current becomes an arbitrary current and the detected actual load current to determine an output voltage of said inverter converting means; and supplying a desired current to said load.

15. A power converter for controlling an AC load comprising:

forward converting means for converting an AC power into a DC power;

reverse converting means for converting the DC power from said forward converting means into an arbitrary AC power;

DC smoothing means and said reverse converting means;

phase controlling means for controlling firing phases of power converting elements constituting said forward converting means;

voltage controlling means for generating a phase reference which controls the DC power in accordance with an output voltage reference; and oscillator means for generating a pulse signal corresponding to an output frequency in accordance with a voltage of the DC power, wherein said power converter further comprises:

frequency detecting means for detecting a frequency of a terminal voltage of said AC load;

comparing/adding means for comparing an output signal from said frequency detecting means with a detection signal of the DC voltage, calculating a deviation therebetween, and adding an output signal from said frequency detecting means to the deviation;

comparing means for comparing a level of an output signal from said comparing/adding means with a level of a voltage/frequency reference signal from a speed setting circuit;

failure detecting means for detecting a failure of a voltage of the AC power; and switching means for switching an input signal of said oscillator means between the voltage/frequency reference signal and the output signal from said comparing/adding means in response to the output signal from said failure detecting means and the output signal from said comparing means.

16. In a power converter for controlling an AC load, a method of converting a power comprising the steps of:

detecting a frequency of a terminal voltage of said motor;

adding a comparison result between the detected frequency and the DC voltage in said power converter to a signal representing the detected frequency;

comparing a signal level of the addition result with a level of a reference signal from a speed setting circuit; and switching a signal for controlling an output frequency of said power converter between the reference signal and the addition result signal in response to an output signal obtained by detecting the failure of the AC input voltage of said power converter and the level comparison result.

* * * * *